Feb. 5, 1952 — R. N. JANEWAY — 2,584,880
SUSPENSION FOR RAILWAY TRUCKS
Filed Dec. 11, 1944 — 5 Sheets-Sheet 2
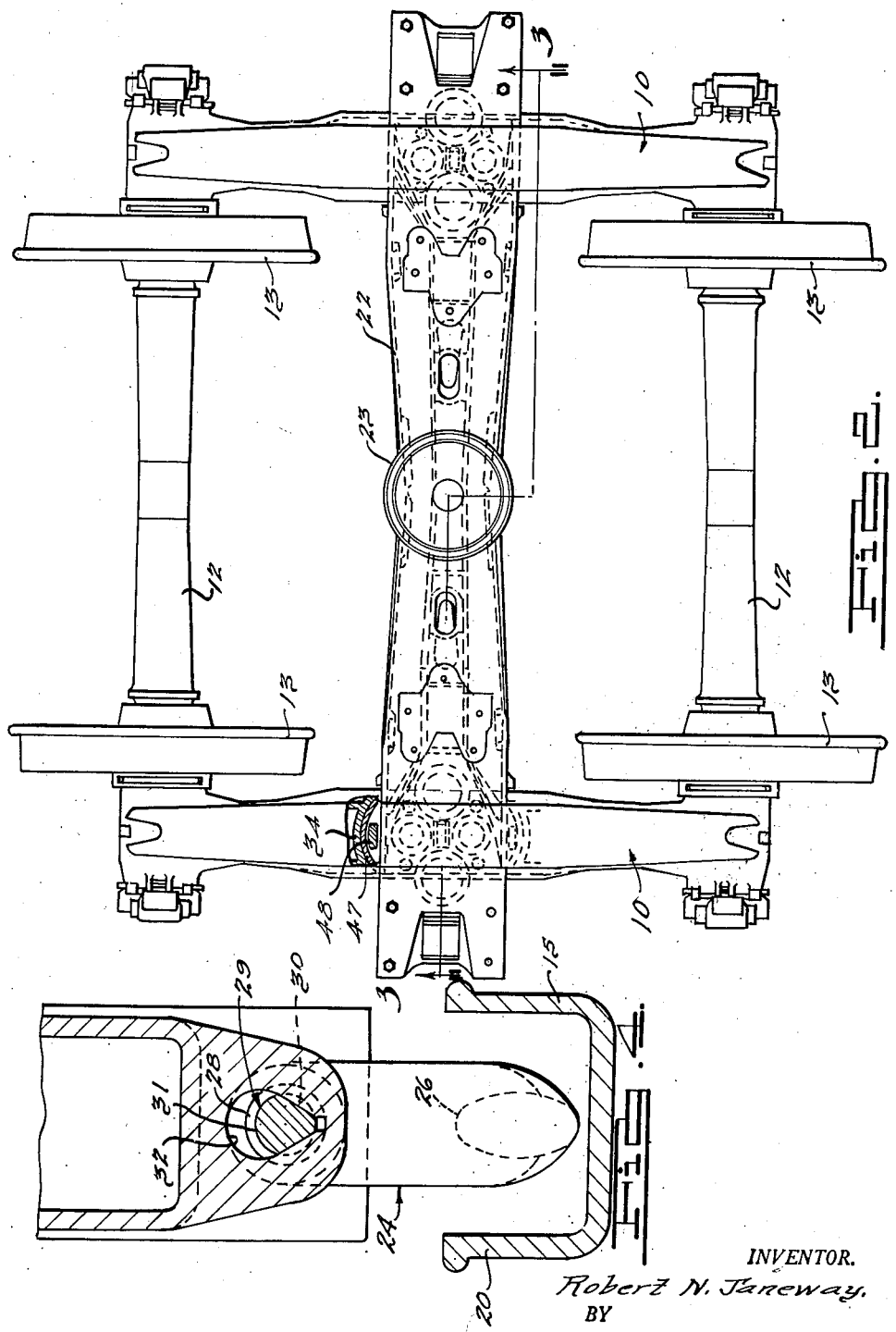
INVENTOR.
Robert N. Janeway,
BY
Harness and Harris
ATTORNEYS.

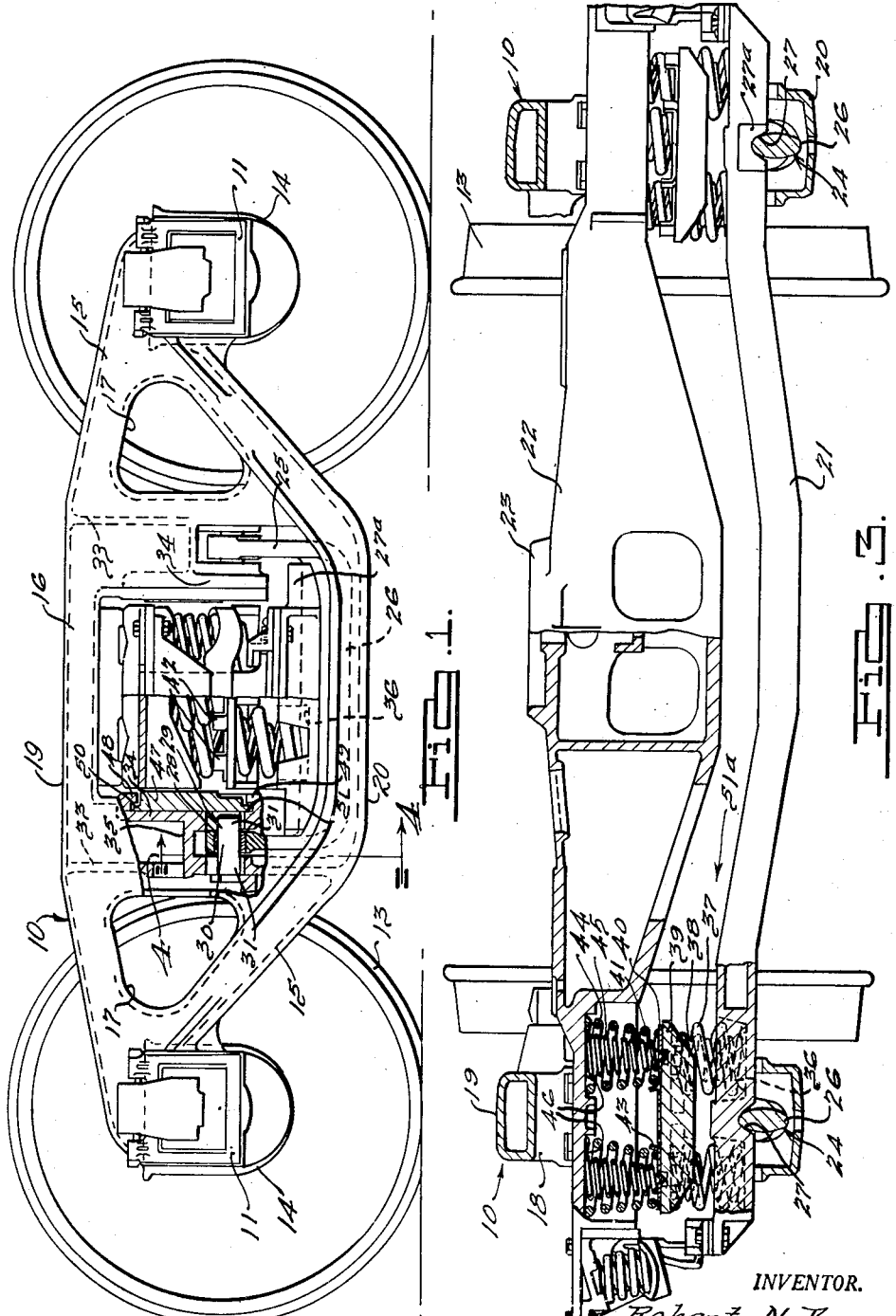

Feb. 5, 1952 R. N. JANEWAY 2,584,880
SUSPENSION FOR RAILWAY TRUCKS
Filed Dec. 11, 1944 5 Sheets-Sheet 3
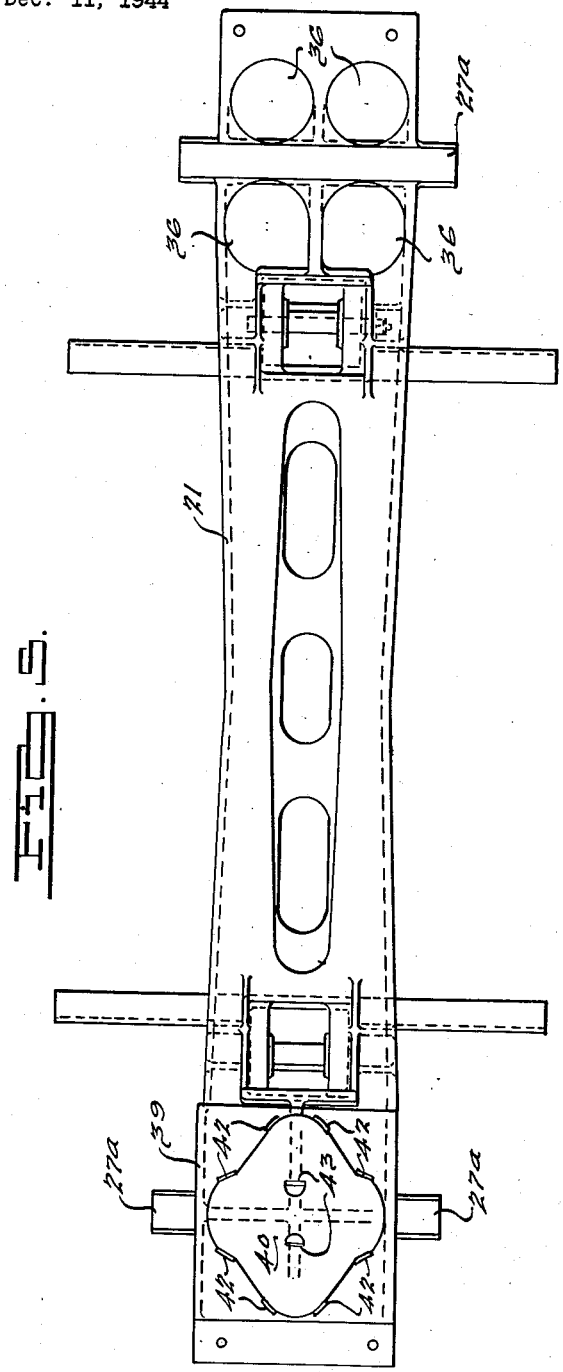
INVENTOR.
Robert N. Janeway.
BY
Harness and Harris
ATTORNEYS.

Feb. 5, 1952   R. N. JANEWAY   2,584,880
SUSPENSION FOR RAILWAY TRUCKS
Filed Dec. 11, 1944   5 Sheets-Sheet 4
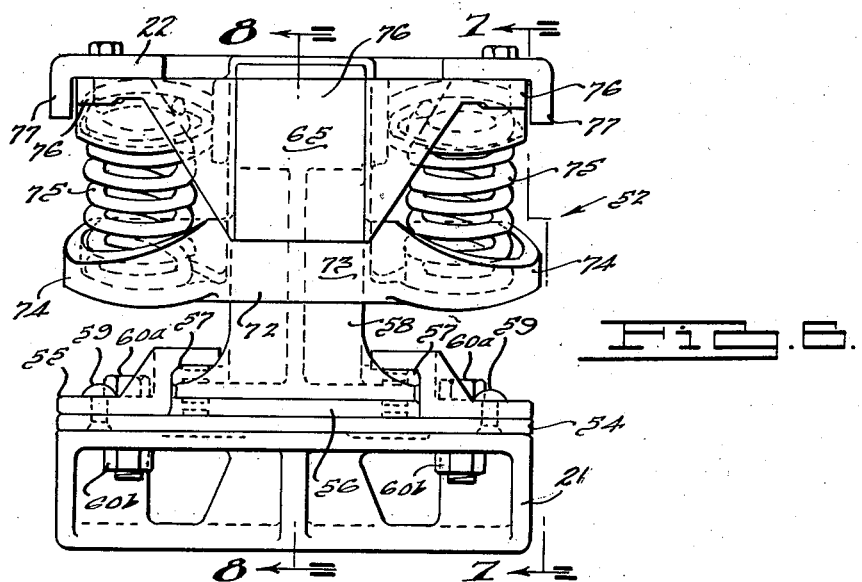
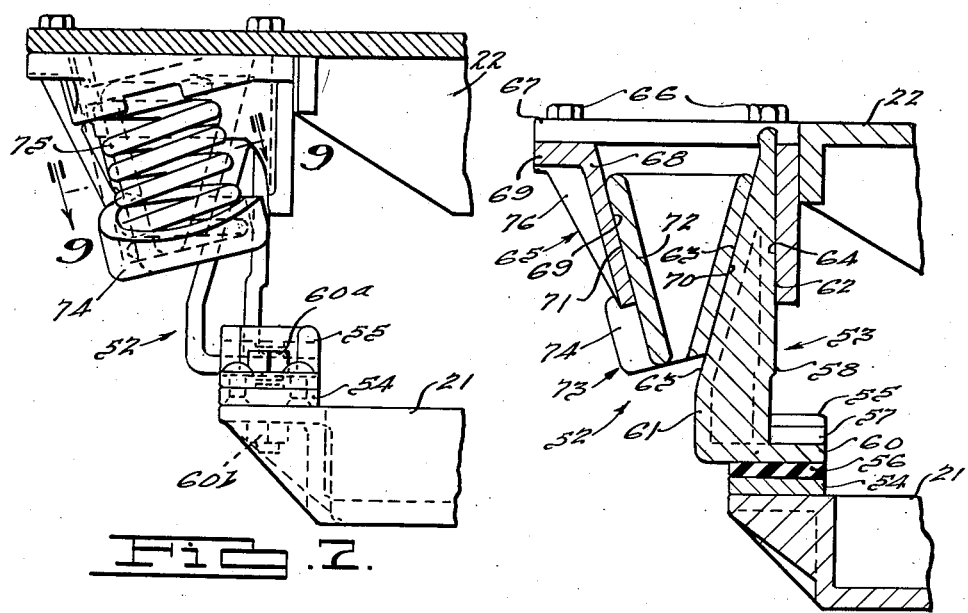
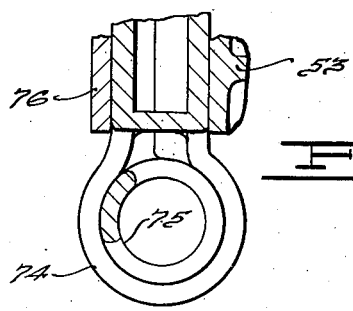
INVENTOR.
Robert N. Janeway.
BY
Harness and Harris
ATTORNEYS.

Feb. 5, 1952  R. N. JANEWAY  2,584,880
SUSPENSION FOR RAILWAY TRUCKS
Filed Dec. 11, 1944  5 Sheets-Sheet 5
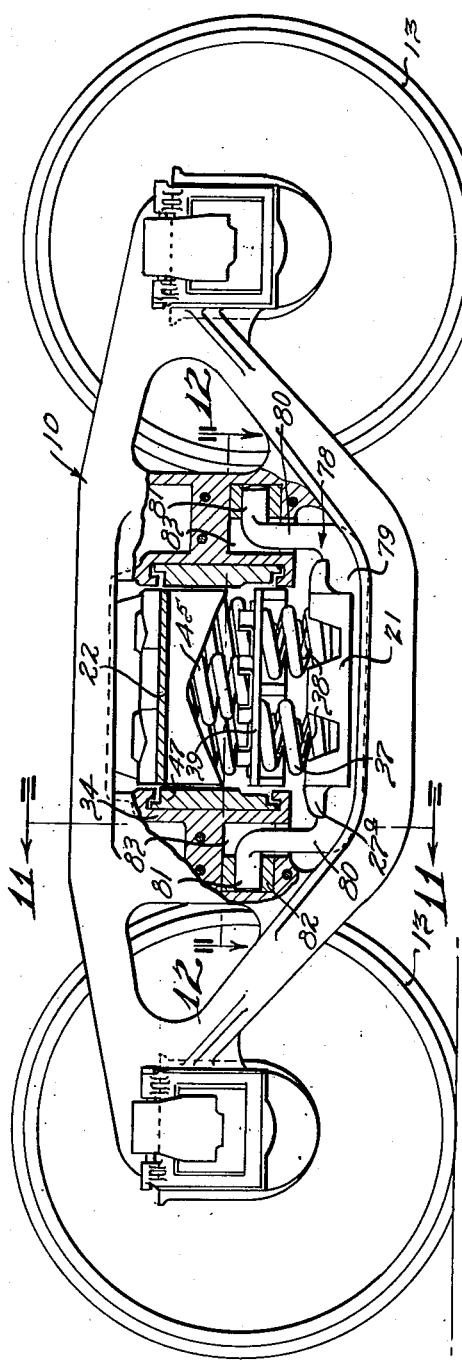
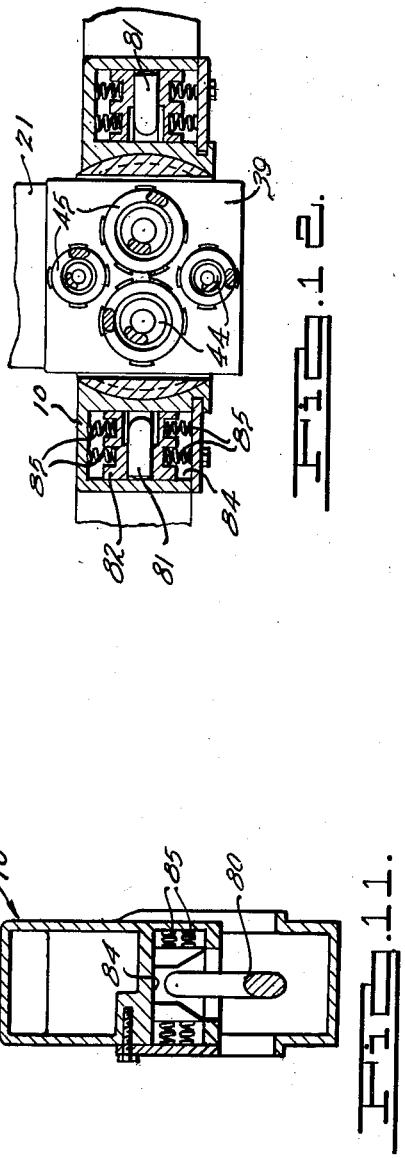
INVENTOR.
Robert N. Janeway.
BY
Harness and Harris
ATTORNEYS.

Patented Feb. 5, 1952

2,584,880

UNITED STATES PATENT OFFICE 2,584,880

SUSPENSION FOR RAILWAY TRUCKS

Robert N. Janeway, Detroit, Mich., assignor to Chrysler Corporation, Highland Park, Mich., a corporation of Delaware Application December 11, 1944, Serial No. 567,603

43 Claims. (Cl. 105—191)

This application relates to railway car trucks and more specifically to an improved suspension means suitable for use in a freight car truck design for high speed service by which vertical and horizontal shocks occasioned by irregularity of track, road bed, switches, crossovers, etc. are substantially dissipated.

The suspension of a freight car truck presents considerable difficulty, because it must serve the freight car both when full and when empty. The range of load from full to empty may be considerable, and it is a problem to provide a resilient means in the suspension that is suitable to both extremes of load. In general springs of ordinary construction have too great a deflection at full load for suitable no load performance so that variation in coupler height exceeds permissible limits. If the springs are made stiff so as to have a total deflection at full load within permissible limits of space, then the springs are too stiff at no load for satisfactory suspension. I have solved this problem by a novel arrangement of springs that provides satisfactory suspension at all loads and yet has a satisfactory deflection between no load and full load. I have also provided the freight car truck with means providing a swinging mounting of the truck bolster on the side frames in a direction transverse of the side frames. The means providing the swinging mounting is also relied upon to control unsquaring of the side frames by permitting movement against elastic resistance, which also restores the side frames to their normal position. In addition to that, I have provided a novel damper or energy absorber that prevents any tendency toward shimmy of the car truck due to periodic squaring and unsquaring.

An object of my invention, generally considered, is to provide in a railway car truck, means for supporting the bolster by swing hangers carried by each side frame, the arrangement being such that both vertical and lateral shocks imposed on the side frames will be wholly or in a large part absorbed by the bolster-supporting means to minimize the shocks imparted to the car body. This arrangement may be advantageously applied to a freight truck having side frames of the truss type, particularly adapted for high speed service.

Another object of the invention is to provide, in a device of the character described, in connection with the novel mounting means for the spring plank, a positive elastic means for returning the side frames of the truck to square relation, should a force applied to one side frame cause it to move relatively longitudinally to the opposite side frame.

Still another object of the invention is to provide in a freight car truck of the truss type, support for the legs of swing hangers located in the column members of side frames and to provide between the swing hangers and their associated spring plank, interengaging portions so that the spring plank and swing hangers act together to restore the side frames of the truck to square position after the application of an unsquaring force. Mounting of the swing hangers in the side frame columns permits the mounting to be at about axle level, whereby the side frames are in stable equilibrium in any position of the swing hangers, and the truck need not be made rigid by special interconnection of the side frames.

Still another object of the invention is to provide the pivot pins for the swing hangers with means on opposite sides of the swing hanger bearing adapted to interlock with corresponding portions provided in the columns of the side frames to prevent rotation and accidental displacement of the pivot pins while the same are in service.

A further object of the present invention is to provide an improved resilient supporting means capable of accommodating a wide range of loads with a total deflection held within permissible limits. Such a resilient means is advantageously applied to a railway car truck, or more specifically to a freight car truck.

A still further object is to provide in a railway car truck such as a freight car truck an improved mounting providing for transverse swinging of the bolster or similar body-connected member with respect to the side frames.

Another object is the provision of an improved suspension that has incorporated therein means controlling unsquaring of a railway car truck and permitting against resistance limited unsquaring desirable in the normal operation of the truck.

Still another object is the provision in a railway car truck, of a novel damper or energy absorber for preventing shimmy of the truck that may be excited by resonant unsquaring impulses imposed upon the truck.

Other objects will appear from the disclosure.

In the drawings:

Fig. 1 is a side view, partially in section, of one form of the novel railway truck of the present invention;

Fig. 2 is a plan view of the truck of Fig. 1;

Fig. 3 is a sectional view taken on the line 3—3 of Fig. 2;

Fig. 4 is a sectional view taken on the line 4—4 of Fig. 1;

Fig. 5 is a plan view of a plank of the truck of the present invention with an intermediate spring-spacing member over one end thereof;

Fig. 6 is an end view of the plank and the bolster of the railroad truck, showing a snubber acting between the plank and the bolster;

Fig. 7 is a sectional view taken on the line 7—7 of Fig. 6;

Fig. 8 is a sectional view taken on the line 8—8 of Fig. 6;

Fig. 9 is a sectional view taken on the line 9—9 of Fig. 7;

Fig. 10 is a side view, partially in section, of a modified form of railroad truck of the present invention;

Fig. 11 is a sectional view taken along the line 11—11 of Fig. 10; and

Fig. 12 is a sectional view taken on the line 12—12 of Fig. 10.

One form of the novel railway truck of the present invention includes equalizer members or side frames 10 having bearings 11 journalling the ends of a pair of axles 12 supported on wheels 13. Each side frame 10 has at its ends housing portions 14 containing the bearings 11. Adjacent the housing portions 14 are portions 15 having top and bottom members diverging in a direction away from the housing portions 14 so that each portion 15 of the side frame is generally triangular in shape. Between the triangular portions 15 is an intermediate portion 16 of rectangular shape. The side frame 10 is of a truss-type construction, the triangular portions 15 having triangular openings 17, and the intermediate rectangular portion 16, a rectangular opening 18. The upper side of the side frame 10 is of rectangular box-like construction as indicated by the reference character 19 in Fig. 3, the same being true of the lower sides of the triangular portions 15. The lower side of the intermediate portion 16 is of channel shape as indicated at 20 in Fig. 3. The upper side of the side frame may be termed a compression member, and the lower side, a tension member.

Extending transversely of the truck through the rectangular openings 18 in the side frames 10 is a plank 21. A bolster 22 is mounted on the plank 21 by resilient means to be described presently. The bolster 22 also extends transversely through the openings 18 in the side frames 10 and has a center bearing 23 at an intermediate region. The plank 21 is supported upon U-shaped swing hangers 24, which have legs 25 and a base 26. The bases 26 of the hangers 24 fit in grooves 27 formed in the under side of the plank 21. Extensions 27ª at the sides of the plank 21 as indicated in Fig. 5 also have the groove 27 so that the groove is of considerable length. The engagement of the bases 26 with the grooves 27 is such as to provide relative angular or pivotal movement between the swing hangers 24 and the plank 21 about the swing hanger bases 26 as axes, and to prevent shifting or angular displacement of the bases of the hangers relative to the plank and transverse of the side frames 10. The free ends of the legs 25 of the swing hangers 24 have openings therethrough provided with bearing sleeves 28, through which extend mounting members 29, having intermediate circular or substantially cylindrical bearing regions 30 mounted in the bearing sleeves 28 and terminal or non-cylindrical regions 31 fitting in correspondingly shaped openings 32 in the side frames 10. Fig. 4 shows the shape of the regions 31 and the openings 32. For each mounting member 29 one opening 32 is formed in a web or vertical transverse wall 33, extending from the top of the side frame 10 to the bottom thereof and marking one end of the central rectangular portion 16 of the side frame. The other opening 32 for each mounting member 29 is formed in a flange or vertical transverse portion 34, which as seen in Fig. 2 is arcuate in transverse section. A portion 35 bridges the space between the portion 34 and the wall 33. The web 33, the flange 34, and the portion 35 constitute a column extending between the top tension member 19 and the bottom compression member 20 of the side frame 10. The non-circular ends 31 on the mounting members 29 and the non-circular openings 32 receiving the ends prevent rotative movement of the mounting members. The swing hangers 24 can swing about the central bearing portions 30 as axes. When this happens, there is angular or pivotal movement of the swing hangers 24 about the bases 26 as axes with respect to the plank 21. Thus the plank 21 may move transversely with respect to the side frames 10. The legs of the swing hangers 24 depend below the portion 35 and so lie within the horizontal limits of the columns of which the portions 35 form parts. The extensions 27ª on the spring plank engage portions of the swing hanger bases below the portions 35 and thus below the columns. This arrangement by which the swing hanger legs depend within the side frame columns and the plank engages the swing hanger base beneath or within the columns, permits the engagement of plank and swing hanger base to be as long as possible for a given width of bolster. It will be noted that the swing hanger base lies in the U of the lower tension member 20 of the side frame. Thus the pivot axes of the hangers 24 are enabled to be relatively low, being slightly lower than the axes of the wheels 13, with the advantage of stability in the truck. By locating the swing-hanger bases between the flanges of the tension members of the side frames and below the level of the tops of said flanges, the springs for supporting the bolster can be sufficiently long to provide a yielding support giving to the bolster the desired movement to cushion vertical shocks imposed thereon. Moreover, in event of failure of the swing hanger, the plank need descend only a short distance to the tension member thereunder, and the swing hanger may be safely trapped in the tension member.

The mounting of the swing hanger pivot pins 29 at or below the level of support of the side members 10 on the axles 12 improves the stability of this truck for it causes the swing hangers 24 to function as pendulums and to return to dead center when the forces causing lateral or transverse swinging of the swing hangers have been dissipated. This prevents tipping or cocking of the side frames on the axles and maintains a stable condition of equilibrium. Obviously if the pivot pins 29 are above the level of support of the side frames on the axles then a stable condition of equilibrium of the side frames does not exist for there will be no restoring force to return the hangers and side frames to dead center after dissipation of the lateral forces causing transverse swinging of the swing hangers.

However, angular movement of the plank 21 about vertical axes through the side frames 10 with respect to the side frames is resisted, because similar movement of the swing hangers 24 with respect to the plank 21 is prevented through engagement of the bases 26 of the swing hangers with the grooves 27 in the plank 21, and similar movement of the swing hangers with respect to the side frames is prevented by the mounting members 29. It has been said that angular movement of the plank 21 about vertical axes through the side frames is resiliently resisted, for the legs 25 of the hangers 24 may shift angularly with respect to one another about the base portion 26 as an axis by causing twisting of the base portion itself within its elastic limit. A small angular movement of the plank 21 results, and this permits a limited amount of movement of one side frame 10 in the direction of its length with respect to the other side frame. This is known as "unsquaring." It occurs when the car truck is traveling on a curve, or when one side of the truck is subjected to a longitudinal impact. When the truck returns to straight track, the side frames 10 must return to their original relative position, and this takes place, because the twisting of the base 26 of the hangers 24 occurs entirely within the elastic limit.

As previously stated, the bolster 23 is resiliently mounted on the plank 21. The means for accomplishing this will now be described. Each end of the plank 21 has formed therein four shallow recesses or seats 36. Mounted in the seats 36 are four sets of springs, each set being composed of an outer cylindrical spring 37 and an inner cylindrical spring 38. An intermediate member 39 rests on the upper ends of the springs 37 and 38 and has four seats on its lower side receiving the said upper ends. A sheet metal plate 40 rests on the upper side of the intermediate member 39 and has pressed-out portions 41 fitting in recesses in the member 39 for locating the plate 40 with respect to the member 39 and flanges 42 and struck-out portions 43 forming spring seats. These seats receive four sets of springs, each set comprising an outer conical spring 44 and an inner conical spring 45. As seen in Figs. 2 and 3, two sets of conical springs have their large ends up, and two sets of conical springs have their large ends down. This arrangement enables the four sets of conical springs to occupy a minimum of space. The upper ends of the conical springs are received in seats 46 formed on the under side of the end of the bolster 22. From the foregoing description it will be apparent that the ends of the bolster 22 are mounted on the ends of the swing plank 21 by means of conical springs and cylindrical springs, the conical springs being in series with the cylindrical springs. The conical springs have a varying rate of deflection that increases with the amount of closing the springs and approaches infinity as the closing of the springs approaches completeness. The reason for the change in the rate of the deflection is that the deflection and closing of the spring moves progressively from the large end toward the small end because the resistance to deflection is smaller the greater the coil diameter for a given thickness of the spring bar the active coils thus become fewer and of smaller diameter. The cylindrical springs have a constant rate of deflection throughout their deflection. The conical springs and cylindrical springs are so proportioned that deflection with light loading begins with all coils of the conical springs operating, and, as the load increases the coils of the conical springs close, beginning at the large ends and progressing toward the small ends thereof until a condition of complete closing of the conical springs is reached, at which point of deflection the cylindrical springs only remain effective. This series arrangement of conical and cylindrical springs is ideally suited to freight cars, in which the loading may vary considerably from empty to full. If relatively stiff cylindrical springs were used they would provide a good mounting for heavy loads, but a poor one for light loads. If relatively soft springs were used so that a good mounting might be had for light loads, then in order to accommodate a heavy load the deflection would be so great as to exceed permissible variations in height of the car body and couplers. Thus a conical spring would apparently provide sufficient resilience at light loads without too great a deflection to accommodate heavy loads, since the greater deflection rate with increasing deflection limits total deflection. However, as the deflection of a conical spring approaches completeness, the rate of deflection approaches infinity, and so a conical spring tends to become too stiff and to have inadequate travel beyond full load. A cylindrical spring arranged in series with the conical spring and proportioned so as to permit continued deflection at a constant rate beyond the upper limit of deflection of the conical spring is thus used.

As previously stated, the transverse vertical column portions 34 are arcuate in transverse section. Engaging the concave side of each portion 34 is a shoe 47, curved on one side and flat on the other side. The curved side engages the portion 34, and the flat side, the bolster 22. The shoe 47 is retained in place at the portion 34 by flanged projections 48 and 49 that engage shoulders 50 and 51 formed at the flat side of the shoe 47. It will be seen that the bolster slides on the flat sides of the shoes 47 as the plank moves transversely through swinging of the hangers 24. When the plank 21 and the bolster 22 pivot with respect to the side frames 10 upon limited unsquaring of the side frames permitted by the elastic twisting of the bases 26 of the hangers 24, the arcuate sides of the shoes 47 slide upon the portions 34 of the side frames. This also takes place as the side frames adjust themselves from unsquared condition to squared condition. Since the shifting of the side frames 10 between squared and unsquared condition takes place as a result of the elasticity of the U-shaped hangers 24, there may be shimmy set up in the parts, and this is prevented by the sliding contact of the arcuate sides of the shoes 47 with the portions 34 of the side frames 10. The shoes 47 and portions 34 act in effect like shock absorbers or dampers and also provide adequate areas of contact between the bolster and the side frames.

Figs. 6-9, inclusive, show snubbers or shock absorbers 52 of a special type for the springs 37, 38, 44, and 45. There is one at each side of the truck, outward of a side frame 10 and attached to an end of the plank 21 and the bolster 22. A lower assembly 53 comprises a plate 54, a pair of clamps 55, a large lower rubber part 56, two small upper rubber parts 57, and an upright member 58. The plate 54 rests upon the upper side of the very end of the plank 21, and to the plate 54 are secured the clamps 55 by rivets 59. The member 58 has a base 60, which is held between the plate 54 and the clamps 55 by the large lower rubber part 56 and the two small upper rubber parts 57. The lower assembly 53 is secured to the end of the plank 21 by bolts 60$^a$ and nuts 60$^b$. The member 58 has an upstanding portion 61, which is of H- section diminishing in size upwardly so that it has a vertical friction surface 62 and an inclined friction surface 63. The vertical friction surface 62 has sliding contact with a vertical surface 64 formed on an upper member 65 secured by bolts 66 to a U-shaped portion 67 formed integral with the end of the bolster 22. The upper member 65 has a central portion 68, on which the vertical surface 64 is formed. The central portion also has an inclined friction surface 69. The surfaces 63 and 69 are inclined in reversed directions to the vertical and are engaged by mating friction surfaces 70 and 71, respectively, formed upon opposite sides of a central portion 72 of a movable member 73. This member has end portions 74, which are shaped as pockets to receive the lower ends of cylindrical springs 75, the upper ends of which are received in pockets formed in end portions 76 of the upper member 65. The sides of the U-shaped portion 67 of the end of the bolster 22 have depending flanges 77, which embrace the end portions 76 of the upper member 65, as shown in Fig. 6. The springs 75 are inclined to the vertical at the same angle as the friction surfaces 69 and 71 on the upper member 65 and the movable member 73. When in operation, the bolster 22 moves downwardly with respect to the plank 21, this movement is resisted by the springs 37, 38, 44, and 45, which have a deflection rate increasing with total deflection or load.

The effectiveness of damping depends upon a ratio of friction force to deflection rate of the spring suspension. In the case of a constant rate suspension a damping device having a constant friction force independent of deflection is satisfactory. However, where the deflection rate of the suspension changes with the deflection as in the suspension of the present application, which is composed of conical springs and cylindrical springs in series, it becomes necessary for the friction of the damper or snubber to vary with the deflection and to be preferably substantially in proportion to the deflection rate of the suspension. In general, the friction should vary in direct proportion to the deflection rate of the suspension.

The shock absorbers 52 have a friction force or, in other words, a resistance to displacement of the shock absorber increasing with overall deflection of the springs. This is due to the arrangement of friction surfaces 63, 70, 69, and 71 and of springs 75. The vertical friction surface 62 and the inclined friction surface 63 provide the member 58 with a wedge shape, which brings about the increasing rate of the absorber 52. Practical considerations dictate that the springs 75 and the friction surfaces 69 and 71, along which sliding of the movable member 73 takes place with respect to the upper member 65, be at an angle to the vertical.

A modified form of a railroad truck is shown in Figs. 10, 11, and 12. In this form there is provided a pair of swing hangers 78, one mounted in each side frame. Each swing hanger is generally similar in shape to the swing hanger of Figs. 1, 2, and 3 in that it is U-shaped. Each hanger 78 has a base 79, a pair of legs 80, and outwardly extending bearing projections 81 at the ends of the legs 80 extending in opposite directions from one another along generally the same straight line. Each bearing projection 81 is of circular section and is mounted in a bearing block 82. Each bearing block is slotted as indicated at 83 to provide a space through which one leg 80 of the hanger 78 may extend. The top and bottom of each bearing block 82 are flat so that the block fits slidably in a correspondingly shaped recess 84 in the side frame 10. The sides of the bearing block 82 are spaced from the sides of the recess in the side frame 10 that receives the block so that the block may slide laterally. The sides of the block have recesses in which rest coil springs 85. The coil springs also engage the sides of the side frame recesses 84, and serve to keep the bearing blocks 82 centered laterally with respect to the recesses 84. The bases 79 of the hangers 78 engage recesses in the plank 21 and in the extensions 27ª in the same manner that bases 26 of U-shaped hangers 24 engage recesses 27 in plank 21 and extensions 27ª in the railway truck of Figs. 1, 2, and 3. In other words, the hangers 78 may pivot with respect to the plank 21 about the bases 79 as axes, but there can be no pivoting of the hangers 78 with respect to the plank 21 about vertical axes or movement of the hangers 78, involving transverse shifting of the bases 79. In the form of Figs. 10, 11, and 12 limited unsquaring of the side frames 10 does not take place as a result of twisting of the legs 80 of the hangers 78 about the bases 79 as axes, but as a result of shifting of the bearing blocks 82 laterally against the springs 85 with respect to the side frame recesses 84. Suppose, for example, that an unsquaring occurs in which the side frame 10 shown in Fig. 10 shifts rightwardly with respect to the other side frame 10, which is above the side frame shown, as viewed in Fig. 12. Then there will be a counterclockwise movement of the plank 21 and a corresponding movement of the hanger 80, involving a downward movement of the left-hand bearing projection 81 and an upward movement of right-hand bearing projection 81. Thus the lower springs 85 at the left and the upper springs at the right will be compressed. When the condition producing the unsquaring is removed as, for example, by return of the railway truck from curved track to straight track, the springs 85 return the parts to the relative position shown in Fig. 12. If the unsquaring causes the side frame 10 shown in Fig. 10 to shift to the left of the unseen side frame 10, then the plank 21 undergoes a clockwise movement with consequent compression of the upper springs 85 to the left and lower springs 85 to the right, as viewed in Fig. 12.

With the truck of Figs. 10, 11, and 12 there is provided the previously described shimmy-preventing means comprising the arcuate walls 34 and the arcuate blocks 47, having straight surfaces along which the bolster 22 moves with transverse swinging of the hangers 78. The truck of Figs. 10, 11, and 12 has its bolster 22 mounted at each end on its plank 21 by means of four cylindrical springs 37, four cylindrical springs 38, four conical springs 44, four conical springs 45, and an intermediate member 39. This truck also has the absorbers 52 of varying rate.

The term "side member" as used in the claims, is intended to cover either a side frame or an equalizing member.

I claim:

1. A railway truck comprising a pair of spaced parallel side members, a pair of swing hangers, means mounting one swing hanger on one side member for providing angular movement of the said one swing hanger with respect to the said one side member about a pivot axis longitudinal of the said one side member, means mounting the other swing hanger on the other side member in similar fashion, and a plank mounted on the swing hangers for angular movement with respect thereto about pivot axes spaced from and parallel to the pivot axes of the swing hangers on the side members, the swing hangers, the mounting means, and the plank preventing substantial unsquaring of the side members and constituting the only means for this purpose, the means mounting the swing hangers on the side members being resilient transversely of the side members so as to provide angular displacement of the pivot axes of the swing hangers on the side members for accommodating limited resisted unsquaring of the side members.

2. A railway truck comprising a pair of spaced parallel side members, a pair of U-shaped swing hangers having bearing projections at the ends of the legs, means mounting one swing hanger on one side member and comprising a pair of bearing blocks each having an opening rotatably receiving the bearing projections of one leg of the swing hangers, and a flat bottom engaging a recess in the said one side member so as to prevent rotation of the bearing block and springs acting between the recess and the sides of the bearing blocks for resiliently restraining movement of the bearing blocks transverse of the said one side member, means mounting the other swing hanger on the other side member in similar fashion, a plank resting on the bases of the swing hangers and associated therewith so as to provide angular movement of the hangers about the bases of the hangers as axes and to prevent shifting or angular displacement of the bases of the hangers relative to the plank and transverse of the side members, the plank, the swing hangers, and the mounting means therefor providing substantial resistance to unsquaring and being the only means for this purpose, the springs in the mounting means permitting transverse shifting of the bearing blocks and a consequent opposed shifting of the ends of the legs of each swing hanger for providing limited unsquaring of the side members.

3. A railway truck comprising a pair of spaced parallel side members, a pair of swing hangers, means mounting one swing hanger on one side member for movement with respect to the said one side member about a pivot axis longitudinal of the said one side member and providing for resiliently resisted transverse movement of the pivot axis, means mounting the other swing hanger on the other side member in similar fashion, and a plank mounted on the swing hangers, the plank, the mounting means, and the swing hangers providing substantial resistance to unsquaring of the side members and constituting the only means for this purpose, the resiliently resisted transverse movement of the pivot axes of the swing hangers permitting limited unsquaring of the side members.

4. A railway truck comprising a pair of spaced parallel side members, a pair of swing hangers, means mounting one swing hanger on one side member for movement with respect thereto about a pivot axis longitudinal thereof, means mounting the other swing hanger on the other side member in similar fashion, a plank mounted on the spring hangers, a bolster spring-mounted on the plank, the plank and the swing hangers providing a substantial resistance to unsquaring of the side members with limited unsquaring permitted involving change in the angle of the plank and the bolster with respect to the side members, means associated with the side members and providing arcuate surfaces, and means presenting surfaces slidably associated with the bolster and arcuate surfaces engageable with the aforesaid arcuate surfaces, the arcuate surfaces sliding on one another during change of the angle of the plank and the bolster with respect to the side members due to unsquaring of the side members so as to prevent shimmy due to unsquaring.

5. A railway truck comprising a pair of spaced parallel side members, a pair of swing hangers, means mounting one swing hanger on one side member for movement with respect thereto about a pivot axis longitudinal thereof, means mounting the other swing hanger on the other side member in similar fashion, a plank mounted on the spring hangers, a bolster spring-mounted on the plank, the plank and the swing hangers providing a substantial resistance to unsquaring of the side members with limited unsquaring permitted involving change in the angle of the plank and the bolster with respect to the side members, means associated with the side members and providing arcuate surfaces having vertical axes in the side members coincident with the axes of movement of the plank and the bolster with respect to the side members produced by the limited unsquaring of the side members, and means presenting arcuate surfaces engaging the aforesaid arcuate surfaces and slidably associated with the bolster for providing for movement of the bolster and the plank transverse of the side members permitted by the swing hangers, the arcuate surfaces sliding on one another during change of the angle of the plank and the bolster with respect to the side members due to unsquaring of the side members so as to prevent shimmy due to unsquaring.

6. A railway truck comprising a pair of spaced parallel side members, a pair of swing hangers, means mounting one swing hanger on one side member for movement with respect thereto about a pivot axis longitudinal thereof, means mounting the other swing hanger on the other side member in similar fashion, a transverse car-supporting means carried by the swing hangers and associated therewith so as to provide substantial resistance to unsquaring of the side members and to constitute with the swing hangers and the mounting means, the only means for this purpose with provision for limited unsquaring involving a change in the angle of the car-supporting means with respect to the side members, and means connected with the side members and the car-supporting means and including surfaces frictionally sliding on one another during change in the angle of the car-supporting means with respect to the side members due to unsquaring for preventing shimmy due to unsquaring.

7. A railway truck comprising a pair of spaced parallel side members, a pair of swing hangers, means mounting one swing hanger on one side member for movement with respect thereto about a pivot axis longitudinal thereof, means mounting the other swing hanger on the other side member in similar fashion, a transverse car-supporting means carried by the swing hangers and associated therewith so as to provide substantial resistance to unsquaring of the side members and to constitute with the swing hangers and the mounting means, the only means for this purpose with provision for limited unsquaring involving a change in the angle of the car-supporting means with respect to the side members, and energy absorbers connected with the side members and slidably associated with the car-supporting means for providing for movement thereof of the side members permitted by the swing hangers, the energy absorbers including arcuate surfaces frictionally sliding on one another during change in the angle of the car-supporting means with respect to the equalizer members due to unsquaring of the side members for preventing shimmy due to unsquaring.

8. A railway truck comprising a pair of spaced parallel side members, a pair of swing hangers, means mounting one swing hanger on one side member for movement with respect thereto about a pivot axis longitudinal thereof, means mounting the other swing hanger on the other side member in similar fashion, a transverse car-supporting means carried by the swing hangers and associated therewith so as to provide substantial resistance to unsquaring of the side members and to constitute with the swing hangers and the mounting means, the only means for this purpose with provision for limited unsquaring involving a change in the angle of the car-supporting means with respect to the side members, means associated with the side members and providing arcuate surfaces having vertical axes in the side members coincident with the axes of movement of the car-supporting means with respect to the side members produced by the limited unsquaring of the side members, and means presenting arcuate surfaces engaging the aforesaid arcuate surfaces and slidably associated with the car-supporting means for providing for movement of the car-supporting means transverse of the side members permitted by the swing hangers, the arcuate surfaces sliding on one another during change of the angle of the car-supporting means with respect to the equalizer members due to unsquaring of the side members so as to prevent shimmy due to unsquaring.

9. A railway truck comprising a pair of spaced parallel side members, swing hangers, means mounting the swing hangers on the side members, a plank mounted on the swing hangers, the swing hangers, the mounting means, and the plank preventing substantial unsquaring of the side members and constituting the only means for this purpose, a bolster mounted on the plank, and an energy absorber connected with the bolster and one side member and having surfaces frictionally sliding on one another during unsquaring of the side members for preventing shimmy due to unsquaring.

10. A railway truck comprising a pair of spaced parallel side members, a pair of swing hangers, means mounting one swing hanger on one side member for providing angular movement of the said one swing hanger with respect to the said one side member about a pivot axis longitudinal of the said one side member, means mounting the other swing hanger on the other side member in similar fashion, a plank mounted on the swing hangers for angular movement with respect thereto about pivot axes spaced from and parallel to the pivot axes of the swing hangers on the side members, the swing hanger, the mounting means, and the plank preventing substantial unsquaring of the side members and constituting the only means for this purpose, the means mounting the swing hangers on the side members being resilient transversely of the side members so as to provide angular displacement of the pivot axes of the swing hangers on the side members for accommodating limited resisted unsquaring of the side members, a bolster mounted on the plank, the limited unsquaring of the side members involving change in the angle of the plank and the bolster with respect to the side members, means associated with the side members and providing arcuate surfaces and means presenting surfaces slidably associated with the bolster and arcuate surfaces engageable with the aforesaid arcuate surfaces, the arcuate surfaces sliding on one another during change of the angle of the plank and the bolster with respect to the side members due to unsquaring of the side members so as to prevent shimmy due to unsquaring.

11. A railway truck comprising a pair of spaced parallel side members, a pair of U-shaped swing hangers having bearing projections at the ends of the legs, means mounting one swing hanger on one side member and comprising a pair of bearing blocks each having an opening rotatably receiving the bearing projection of one leg of the swing hangers, and a flat bottom engaging a recess in the said one side member so as to prevent rotation of the bearing block and springs acting between the recess and the sides of the bearing blocks for resiliently restraining movement of the bearing blocks transverse of the said one side member, means mounting the other swing hanger on the other side member in similar fashion, a plank resting on the bases of the swing hangers and associated therewith so as to provide angular movement of the hangers about the bases of the hangers as axes and to prevent shifting or angular displacement of the bases of the hangers relative to the plank and transverse of the side members, the plank, the swing hangers, and the mounting means therefor providing substantial resistance to unsquaring and being the only means for this purpose, the springs in the mounting means permitting transverse shifting of the bearing blocks and a consequent opposed shifting of the ends of the legs of each swing hanger for providing limited unsquaring of the side members, a bolster mounted on the plank, the limited unsquaring of the side members involving change in the angle of the plank and the bolster with respect to the side members, means associated with the side members and providing arcuate surfaces having vertical axes in the side members coincident with the axes of movement of the plank and the bolster with respect to the side members produced by the limited unsquaring of the side members, and means presenting arcuate surfaces engaging the aforesaid arcuate surfaces and slidably associated with the bolster for providing for movement of the bolster and the plank transverse of the side members permitted by the swinging hangers, the arcuate surfaces sliding on one another during change of the ange of the plank and the bolster with respect to the side members due to unsquaring of the side members so as to prevent shimmy due to unsquaring.

12. A railway truck comprising a pair of spaced parallel side members, a pair of swing hangers, means mounting one swing hanger on one side member for movement with respect to the said one side member about a pivot axis longitudinal of the said one side member and providing for resiliently resisted transverse movement of the pivot axis, means mounting the other swing hanger on the other side member in similar fashion, a transverse car-supporting means mounted on the swing hangers, the car-supporting means and the swing hangers providing substantial resistance to unsquaring of the side members and constituting the only means for this purpose, the resiliently resisted transverse movement of the pivot axes of the swing hangers permitting limited unsquaring of the side members involving change in the angle of the car-supporting means with respect to the side members, and energy absorbers connected with the side members and slidably associated with the car-supporting means for providing for movement thereof transverse of the side members permitted by the swing hangers, the energy absorbers including arcuate surfaces frictionally sliding on one another during change in the angle of the car-supporting means with respect to the side members due to unsquaring of the equalizer members for preventing shimmy due to unsquaring.

13. A railway truck comprising a pair of spaced parallel side members, a pair of U-shaped swing hangers, a first set of mounting members spaced in alignment longitudinal of one side member and supporting the ends of the legs of one swing hanger upon an axis longitudinal of the said one side member for providing angular movement of the said one swing hanger about the said axis and preventing shifting or angular displacement of the mounting members transverse of the said one side member, a second set of mounting members associated with the other swing hanger and the other side member in similar fashion, a plank resting on the bases of the U-shaped hangers and associated therewith so as to provide angular movement of the plank with respect to the hangers about the bases of the hangers as axes and to prevent shifting or angular displacement of the bases of the hangers relative to the plank and transverse of the side members, a bolster resiliently mounted on the plank, the plank, the hangers, and the mounting members providing transverse swinging of the plank with respect to the side members and substantial resistance to unsquaring of the side members and constituting the only means for this purpose, elastic twisting of the legs of the hangers with respect to the bases thereof being sufficient to provide limited unsquaring of the side members involving change in the angle of the plank and the bolster with respect to the side members, and energy absorbers connected with the side members and the bolster and including surfaces frictionally sliding on one another during the aforesaid change in the angle of the plank and the bolster due to unsquaring of the side members for preventing shimmy due to the unsquaring.

14. A railway truck comprising a pair of spaced parallel side members, a pair of swing hangers, means mounting one swing hanger upon one side member for providing movement with respect thereto about an axis longitudinal thereof and preventing shifting of the portions of the said one swing hanger associated with the mounting means transverse of the said one side member, means mounting the other swing hanger in similar fashion upon the other side member, and a plank supported upon the swing hangers on mountings providing angular movement of the swing hangers with respect to the plank about axes longitudinal of the side members and displaced from the axes of the swing hangers upon the side members and preventing shifting or angular displacement of the axes of the plank and the swing hangers relative to the plank and transverse of the side members, the relative movement between the swing hangers and the equalizer members and between the plank and the swing hangers about the axes providing transverse swinging of the plank with respect to the side members, the prevention of transverse shifting of the portions of the swing hangers associated with the mounting means and the prevention of transverse shifting or angular displacement of the axes of the swing hangers on the plank relative to the plank providing substantial resistance to unsquaring of the side members and constituting the only cause for this, elastic twisting of the legs of the U-shaped hangers about the bases providing a limited unsquaring of the side members, a bolster resiliently mounted on the plank, the limited unsquaring of the side members involving angular movement of the plank and the bolster with respect to the side members, and energy absorbers connected with the side members and slidably associated with the bolster to accommodate movement of the bolster and the plank transverse of the side members permitted by the swing hangers, the energy absorbers including arcuate surfaces having vertical axes in the side members determining the axes of the aforesaid angular movement of the plank and the bolster and frictionally sliding on one another during such movement to prevent shimmy due to unsquaring.

15. A railway truck comprising a pair of spaced parallel side members, a pair of U-shaped swing hangers, means mounting the swing hangers on the side members on pivot axes longitudinal of the side members positively preventing displacement transverse of the side members of portions of the swing hangers associated with the mounting means, and a transverse car-supporting means mounted on the swing hangers, the swing hangers, the mounting means, and the car-supporting means preventing substantial unsquaring of the side members and constituting the only means for this purpose, elastic twisting of the legs of the U-shaped hangers about the bases providing limited unsquaring of the side members involving change in the angle of the car-supporting means with respect to the side members, and energy-absorbing means connected with the car-supporting means and one side member and including arcuate surfaces frictionally sliding on one another during change in the aforesaid angle of the car-supporting means caused by unsquaring to prevent shimmy due to the unsquaring.

16. A railway truck comprising a pair of spaced parallel side members, swing hangers, means mounting the swing hangers on the side members, a plank mounted on the swing hangers, the swing hangers, the mounting means, and the plank preventing unsquaring of the side members and constituting the only means for this purpose, a bolster positioned over the plank, and a cylindrical coil spring and a conical coil spring arranged in series between the bolster and the plank, the conical spring being of the type having the outer diameter of one turn greater than the inner diameter of the next larger turn so as to retain a conical form when collapsed with one turn abutting an adjacent turn.

17. A railway truck comprising a pair of spaced parallel side members, swing hangers, means mounting the swing hangers on the side members, a plank mounted on the swing hangers, the swing hangers, the mounting means, and the plank preventing substantial unsquaring of the side members and constituting the only means for this purpose, a bolster positioned over the plank, a cylindrical coil spring, and a plurality of conical coil springs arranged in parallel with one another and in series with the cylindrical coil spring so as to cooperate therewith in supporting the bolster on the plank, some conical springs being arranged with their large ends adjacent the cylindrical spring and other conical springs being arranged with their small ends adjacent the cylindrical spring for minimizing the space occupied by the conical spring, the conical springs being of the type having the outer diameter of one turn greater than the inner diameter of the next larger so as to retain a conical form when collapsed with one turn abutting an adjacent turn.

18. A railway truck comprising a pair of spaced parallel side members, a pair of swing hangers, means mounting one swing hanger on one side member for providing angular movement of the said one swing hanger with respect to the said one side member about a pivot axis longitudinal of the said one side member, means mounting the other swing hanger on the other side member in similar fashion, a plank mounted on the swing hangers for angular movement with respect thereto about pivot axes spaced from and parallel to the pivot axes of the swing hangers on the side members, the swing hangers, the mounting means, and the plank preventing substantial unsquaring of the side members and constituting the only means for this purpose, the means mounting the swing hangers on the side members being resilient transversely of the side members so as to provide angular displacement of the pivot axes of the swing hangers on the side members for accommodating limited resisted unsquaring of the side members, a bolster positioned over the plank, and a cylindrical coil spring and a conical coil spring arranged in series between the bolster and the plank, the conical spring being of the type having the outer diameter of one turn greater than the inner diameter of the next larger turn so as to retain a conical form when collapsed with one turn abutting an adjacent turn.

19. A railway truck comprising a pair of spaced parallel side members, a pair of swing hangers, means mounting one swing hanger on one side member for providing angular movement of the said one swing hanger with respect to the said one side member about a pivot axis longitudinal of the said one side member, means mounting the other swing hanger on the other side member in similar fashion, a plank mounted on the swing hangers for angular movement with respect thereto about pivot axes spaced from and parallel to the pivot axes of the swing hangers on the side members, the swing hangers, the mounting means, and the plank preventing substantial unsquaring of the side members and constituting the only means for this purpose, the means mounting the swing hangers on the side members being resilient transversely of the side members so as to provide angular displacement of the pivot axes of the swing hangers on the side members for accommodating limited resisted unsquaring of the side members, a bolster positioned over the plank, a cylindrical coil spring, and a plurality of conical coil springs arranged in parallel with one another and in series with the cylindrical coil spring so as to cooperate therewith in supporting the bolster on the plank, some conical springs being arranged with their large ends adjacent the cylindrical spring and other conical springs being arranged with their small ends adjacent the cylindrical spring for minimizing the space occupied by the conical spring, the conical springs being of the type having the outer diameter of one turn greater than the inner diameter of the next larger so as to retain a conical form when collapsed with one turn abutting an adjacent turn.

20. A railway truck comprising a pair of spaced parallel side members, a pair of swing hangers, means mounting one swing hanger on one side member for movement with respect thereto about a pivot axis longitudinal thereof, means mounting the other swing hanger on the other side member in similar fashion, a plank mounted on the spring hangers, a bolster spring-mounted on the plank, the plank and the swing hangers providing a substantial resistance to unsquaring of the side members with limited unsquaring permitted involving change in the angle of the plank and the bolster with the side members, means associated with the equalizer members and providing arcuate surfaces, means presenting surfaces slidably associated with the bolster and arcuate surfaces engageable with the aforesaid arcuate surfaces, the arcuate surfaces sliding on one another during change of the angle of the plank and the bolster with respect to the side members due to unsquaring of the equalizer members so as to prevent shimmy due to unsquaring, and a cylindrical coil spring and a conical coil spring arranged in series between the bolster and the plank, the conical spring being of the type having the outer diameter of one turn greater than the inner diameter of the next larger turn so as to retain a conical form when collapsed with one turn abutting an adjacent turn.

21. A railway truck comprising a pair of spaced parallel side members, a pair of swing hangers, means mounting one swing hanger on one side member for movement with respect thereto about a pivot axis longitudinal thereof, means mounting the other swing hanger on the other side member in similar fashion, a plank mounted on the spring hangers, a bolster spring-mounted on the plank, the plank and the swing hangers providing a substantial resistance to unsquaring of the side members with limited unsquaring permitted involving change in the angle of the plank and the bolster with respect to the side members, means associated with the equalizer members and providing arcuate surfaces having vertical axes in the side members coincident with the axes of movement of the plank and the bolster with respect to the side members produced by the limited unsquaring of the side members, means presenting arcuate surfaces engaging the aforesaid arcuate surfaces and slidably associated with the bolster for providing for movement of the bolster and the plank transverse of the side members permitted by the swing hangers, the arcuate surfaces sliding on one another during change of the angle of the plank and the bolster with respect to the side members due to unsquaring of the side members so as to prevent shimmy due to unsquaring, a cylindrical coil spring, and a plurality of conical coil springs arranged in parallel with one another and in series with the cylindrical coil spring so as to cooperate therewith in supporting the bolster on the plank, some conical springs being arranged with their large ends adjacent the cylindrical spring and other conical springs being arranged with their small ends adjacent the cylindrical spring for minimizing the space occupied by the conical spring, the conical springs being of the type having the outer diameter of one turn greater than the inner diameter of the next larger turn so as to retain a conical form when collapsed with one turn abutting an adjacent turn.

22. A railway truck comprising a pair of spaced parallel side members, a pair of U-shaped swing hangers, a first set of mounting members spaced in alignment longitudinal of one side member and supporting the ends of the legs of one swing hanger upon an axis longitudinal of the said one side member for providing angular movement of the said one swing hanger about the said axis and preventing shifting or angular displacement of the mounting members transverse of the said one side member, a second set of mounting members associated with the other swing hanger and the other side member in similar fashion, a plank resting on the bases of the U-shaped hangers and associated therewith so as to provide angular movement of the plank with respect to the hangers about the bases of the hangers as axes and to prevent shifting or angular displacement of the bases of the hangers relative to the plank and transverse of the side members, a bolster resiliently mounted on the plank, the plank, the hangers, and the mounting members providing transverse swinging of the plank with respect to the side members and substantial resistance to unsquaring of the equalizer members and constituting the only means for this purpose, elastic twisting of the legs of the hangers with respect to the bases thereof being sufficient to provide limited unsquaring of the side members involving change in the angle of the plank and the bolster with respect to the side members, energy absorbers connected with the equalizer members and the bolster and including surfaces frictionally sliding on one another during the aforesaid change in the angle of the plank and the bolster due to unsquaring of the side members for preventing shimmy due to the unsquaring, a cylindrical coil spring, and a plurality of conical coil springs arranged in parallel with one another and in series with the cylindrical coil spring so as to cooperate therewith in supporting the bolster on the plank, some conical springs being arranged with their large ends adjacent the cylindrical spring and other conical springs being arranged with their small ends adjacent the cylindrical spring for minimizing the space occupied by the conical spring, the conical springs being of the type having the outer diameter of one turn greater than the inner diameter of the next larger turn so as to retain a conical form when collapsed with one turn abutting an adjacent turn.

23. A railway truck comprising a pair of spaced parallel side members, a pair of U-shaped swing hangers, means mounting the swing hangers on the side members on pivot axes longitudinal of the side members positively preventing displacement transverse of the side members of portions of the swing hangers associated with the mounting means, and a transverse car-supporting means comprising a bolster and a plank mounted on the swing hangers, the swing hangers and the car-supporting means preventing substantial unsquaring of the side members and constituting the only means for this purpose, elastic twisting of the legs of the U-shaped hangers above the bases providing limited unsquaring of the side members involving change in the angle of the car-supporting means with respect to the side members, energy-absorbing means connected with the car-supporting means and one side member and including arcuate surfaces frictionally sliding on one another during change in the aforesaid angle of the car-supporting means caused by unsquaring to prevent shimmy due to the unsquaring, and a cylindrical coil spring and a conical coil spring arranged in series between the bolster and the plank, the conical spring being of the type having the outer diameter of one turn greater than the inner diameter of the next larger turn so as to retain a conical form when collapsed with one turn abutting an adjacent turn.

24. In a railway truck comprising a pair of axles, wheels therefor, a pair of spaced side members connecting the axles and being free of transverse ties tending to prevent tilting of the side members, swing hangers, means mounting the swing hangers on the side members on axes at approximately the level of the axles but below the points of support of the side members on the axles, and a plank mounted on the swing hangers, the swing hangers, the mounting means, and the plank preventing substantial unsquaring of the side members and constituting the only means for this purpose, the mountings of the swing hangers on the side members and the plank on swing hangers cooperating with the plank and swing hangers to provide a degree of elasticity sufficient to permit limited unsquaring of the side members.

25. A railway truck comprising a pair of spaced axles, a pair of spaced parallel side members connecting the axles, a pair of U-shaped swing hangers provided with relatively short legs and bearing projections at the ends of the legs having axes at approximately the level of the axes of the axles, means mounting one swing hanger on one side member and comprising a pair of bearing blocks each having an opening rotatably receiving the bearing projections of one leg of the swing hangers, and a flat bottom engaging a recess in the said one side member so as to prevent rotation of the bearing block and springs acting between the recess and the sides of the bearing blocks for resiliently restraining movement of the bearing blocks transverse of the said one side member, means mounting the other swing hanger on the other side member in similar fashion, a plank resting on the bases of the swing hangers and associated therewith so as to provide angular movement of the hangers about the bases of the hangers as axes and to prevent shifting or angular displacement of the bases of the hangers relative to the plank and transverse of the side members, the plank, the swing hangers, and the mounting means therefor providing substantial resistance to unsquaring and being the only means for this purpose, the springs in the mounting means permitting transverse shifting of the bearing blocks and a consequent opposed shifting of the ends of the legs of each swing hanger for providing limited unsquaring of the side members.

26. In a railway truck comprising a pair of spaced side members, swing hangers, means pivotally mounting the swing hangers on the side members, a plank pivotally mounted on the swing hangers, and a bolster resiliently mounted on the plank and free of any association with the side members tending to prevent unsquaring of the truck, the swing hangers, the several pivotal mounting means, and the plank preventing substantial unsquaring of the truck and constituting the only means for this purpose, the mountings of the swing hangers on the side members and the plank on swing hangers cooperating with the plank and swing hangers to provide a degree of elasticity sufficient to permit limited unsquaring of the side members.

27. In a railway truck comprising a pair of spaced side members, a pair of swing hangers, means mounting the swing hangers on the side members, body-supporting means, and means pivotally mounting the body-supporting means on the swing hangers, the swing hangers, both mounting means, and the body-supporting means preventing substantial unsquaring of the truck and constituting the only means for this purpose, the body-supporting means including a bolster resiliently mounted on the swing hangers and free of any association with the side members tending to prevent unsquaring of the truck, the mountings of the swing hangers on the side members and the plank on swing hangers cooperating with the plank and swing hangers to provide a degree of elasticity sufficient to permit limited unsquaring of the side members.

28. In a railway truck comprising a pair of spaced side members, a pair of swing hangers, means mounting the swing hangers on the side members, car-body-supporting means, means pivotally mounting the car-body-supporting means on the swing hangers, the swing hangers, both mounting means, and the car-body-supporting means preventing substantial unsquaring of the truck and constituting the only means for this purpose, the car-body-supporting means being free of any association with the side members tending to prevent unsquaring of the truck except by way of the swing hangers and the mounting means, the mountings of the swing hangers on the side members and the plank on swing hangers cooperating with the plank and swing hangers to provide a degree of elasticity sufficient to permit limited unsquaring of the side members.

29. A railway truck comprising a pair of spaced side members, swing hangers having bases, means mounting the swing hangers on the side members, a plank resting on the bases of the hangers and associated therewith so as to provide angular movement of the plank with respect to the bases of the hangers about the bases of the hangers as axes and to prevent shifting or angular displacement of the bases of the hangers relative to the plank and transverse of the side members, the plank, the swing hangers, and the mounting means preventing substantial unsquaring of the truck and constituting the only means for this purpose, and a bolster mounted on the plank so as to be free of any association with the side members tending to prevent unsquaring of the truck, the mountings of the swing hangers on the side members and the plank on swing hangers cooperating with the plank and swing hangers to provide a degree of elasticity sufficient to permit limited unsquaring of the side members.

30. A railway truck comprising a pair of spaced side members, swing hangers having bases, means mounting the swing hangers on the side members, car-body-supporting means resting on the bases of the hangers and associated therewith so as to provide angular movement of the supporting means with respect to the bases of the hangers about the bases of the hangers as axes and to prevent shifting or angular displacement of the bases of the hangers relative to the supporting means and transverse of the side members, the car-body-supporting means, the swing hangers and the mounting means preventing substantial unsquaring of the truck and constituting the only means for this purpose, the car-body-supporting means including a bolster free of any association with the side members tending to prevent unsquaring of the truck, the mountings of the swing hangers on the side members and the plank on swing hangers cooperating with the plank and swing hangers to provide a degree of elasticity sufficient to permit limited unsquaring of the side members.

31. In a railway truck comprising a pair of spaced axles, a pair of spaced side members mounted on and extending between the axles and being free of rigid transverse ties tending to prevent tilting of the side members, swing hangers, means mounting the swing hangers on the side members at approximately the level of the axles but below the level of the points of support of the side members on the axles, car-body-supporting means, and means pivotally mounting the car-body-supporting means on the swing hangers, the mountings of the swing hangers on the side members and the plank on swing hangers cooperating with the plank and swing hangers to provide a degree of elasticity sufficient to permit limited unsquaring of the side members.

32. In a railway truck comprising a pair of spaced axles, a pair of spaced side members mounted on and extending between the axles and being free of transverse ties tending to prevent tilting of the side members, swing hangers, means mounting the swing hangers on the side members at approximately the level of the axles but below the level of support of the side members on the axles, car-body-supporting means, and means mounting the car-body-supporting means on the swing hangers and including a bolster positioned to extend between the side members free of any association with the side members tending to prevent unsquaring of the truck, the swing hangers, both mounting means, and the car-body-supporting means preventing substantial unsquaring of the truck and constituting the only means for this purpose, the car-body-supporting means being free of any association with the side members tending to prevent unsquaring of the truck except by way of the swing hangers and both mounting means, the mountings of the swing hangers on the side members and the plank on swing hangers cooperating with the plank and swing hangers to provide a degree of elasticity sufficient to permit limited unsquaring of the side members.

33. A railway truck comprising a pair of spaced axles, a pair of spaced side members connecting the axles and being free of transverse ties tending to prevent tilting of the side members, swing hangers, means mounting the swing hangers on the side members at approximately the level of the axles, a plank resting on the bases of the hangers and associated therewith so as to provide angular movement of the plank with respect to the bases of the hangers about the bases of the hangers as axes and to prevent shifting or angular displacement of the bases of the hangers relative to the plank and transverse of the side members, the plank, the swing hangers, and the mounting means preventing substantial unsquaring of the truck and constituting the only means for this purpose, the mountings of the swing hangers on the side members and the plank on swing hangers cooperating with the plank and swing hangers to provide a degree of elasticity sufficient to permit limited unsquaring of the side members and a bolster mounted on the plank so as to be free of any association with the side members tending to prevent unsquaring of the truck.

34. In a car truck of the type having axles and spaced side frames connecting the axles, each side frame being provided with a window opening defined by longitudinally spaced columns joined by a top compression member and a bottom tension member, the combination of, swing hangers substantially U-shaped in outline, each swing hanger being pivotally connected to one side frame, the pivotal axis of each hanger being substantially in horizontal alignment with the axles of the said truck, a load supporting spring plank extending transversely of said truck and supported at either end by one of said swing hangers, the said spring plank having portions overlying and pivotally interfitting with the adjacent portions of the swing hangers, a bolster, and springs interposed between the bolster ends and the adjacent portions of the spring plank, the interfitting portions of the spring plank lying beneath the corresponding columns of the respective side frames.

35. In a car truck of the type having a side frame mounted at the ends on spaced axles, said side frame being formed with a window opening defined by longitudinally spaced columns joined by a top compression member and a bottom tension member, the combination of, seats formed in each column substantially at or below the height of the axles, pivot pins locked against movement relative to said columns and nesting with said seats, a hanger pivotally supported by said pivot pins and comprising a base and legs entirely within the horizontal limits of said columns, a load supporting spring plank extending through said window opening and movably mounted on said hanger base, and a bolster extending through said window opening and spring mounted on said spring plank.

36. A railway truck comprising a pair of spaced parallel side members, a pair of U-shaped swing hangers having circular openings in the ends of the legs, a first pair of mounting members spaced from one another in alignment longitudinal of one side member at the approximate level of the axles and having intermediate circular bearing regions engaging the circular openings in the legs of one swing hanger for providing angular movement of the said one swing hanger with respect to the said one side member about a longitudinal axis and terminal wedge-shaped regions decreasing in thickness in a downward direction fitting in correspondingly shaped recesses in the said one side member for preventing rotation of the mounting members and angular displacement or shifting of the mounting members transverse of the said one side member, a second pair of mounting members similar to the first pair and associated with the other side member and the other swing hanger in the same way, and a plank resting on the bases of the U-shaped hangers and associated therewith so as to provide angular movement of the plank with respect to the bases of the hangers about the bases of the hangers as axes, this angular movement combining with that between the hangers and the side members to provide swinging of the plank transverse of the side members, and prevention of angular displacement or shifting of the bases of the hangers relative to the plank and transverse of the side members, this prevention and the prevention of transverse shifting or angular displacement of the mounting members effecting a substantial resistance to unsquaring of the side members and constituting the only cause for this, relative angular movement between the legs of the hangers resulting from elastic twisting of the bases of the hangers being sufficient to provide limited unsquaring of the side members.

37. A railway truck comprising a pair of spaced parallel side members, a pair of U-shaped swing hangers having circular openings in the ends of the legs, a first pair of mounting members spaced from one another in alignment longitudinal of one side member and having intermediate circular bearing regions engaging the circular openings in the legs of one swing hanger for providing angular movement of the said one swing hanger with respect to the said one side member about a longitudinal axis and terminal wedge-shaped regions decreasing in thickness in a downward direction and fitting in correspondingly shaped recesses in the said one side member for preventing rotation of the mounting members and angular displacement or shifting of the mounting members transverse of the said one side member, a second pair of mounting members similar to the first pair and associated with the other side member and the other swing hanger in the same way, and a plank resting on the bases of the U-shaped hangers and associated therewith so as to provide angular movement of the plank with respect to the bases of the hangers about the bases of the hangers as axes, this angular movement combining with that between the hangers and the side members to provide swinging of the plank transverse of the side members, and prevention of angular displacement or shifting of the bases of the hangers relative to the plank and transverse of the side members, this prevention and the prevention of transverse shifting or angular displacement of the mounting members effecting a substantial resistance to unsquaring of the side members and constituting the only cause for this, relative angular movement between the legs of the hangers resulting from elastic twisting of the bases of the hangers being sufficient to provide limited unsquaring of the side members.

38. In a car truck of the type having a pair of spaced side frames each formed with a window opening defined by longitudinally spaced columns joined by a top compression member and a bottom tension member, the combination of a bolster extending between said side frames with each end thereof positioned in a window opening, flanges formed on the inner faces of said columns for receiving movable shoes adapted to slidably engage and guide the movement of said bolster, a web connecting the side walls of each column outwardly of said flanges, swing hangers substantially U-shaped in outline positioned in the window opening of each side frame, and means supported by said column members and intersecting said column webs for pivotally supporting said swing hangers, load supporting means carried by said swing hangers for connecting the said side frames, and yielding means interposed between said bolster and said last-named load supporting means, said yielding means being positioned in the window opening of each side frame.

39. In a car truck of the type having a pair of spaced side frames mounted on a pair of spaced axles wherein each side frame is formed with a window opening defined by longitudinally spaced columns joined by a top compression member and a bottom tension member, the combination of, a pair of swing hangers substantially U-shaped in outline, each swing hanger being pivotally connected to one side frame for transverse swinging movement relative thereto, the pivotal axes of said hangers being substantially in horizontal alignment with the axles of the said truck, and a load supporting spring plank extending transversely of said truck and pivotally supported at either end by one of said swing hangers, said spring plank being of substantially flat, rigid construction and having an effective width at the ends thereof substantially greater than the width in the central portion intermediate the ends, a bolster, springs interposed between the bolster ends and the adjacent portions of the spring plank, and projections on opposite sides of the spring-seating portions of the plank engaging the swing-hanger bases, the swing hangers and their connections to the side frames and to the spring plank providing the only means for resisting substantial unsquaring of the side frames yet including sufficient resilience to permit limited unsquaring of the side frames.

40. In a car truck of the type having axles and spaced side frames connecting the axles, each side frame being provided with a window opening defined by longitudinally spaced columns joined by a top compression member and a bottom tension member, the combination of a pair of swing hangers substantially U-shaped in outline, each swing hanger being pivotally connected to one side frame, the pivotal axis of each hanger being substantially in horizontal alignment with the axles of the said truck, a load supporting spring plank extending transversely of said truck and pivotally supported at either end by one of said swing hangers, a bolster overlying said spring plank, springs interposed between the bolster ends and the adjacent portions of the spring plank, and projections on opposite sides of the spring-seating portions of the plank engaging the swing-hanger bases and lying beneath the corresponding columns of the respective side frames.

41. In a railway truck comprising a pair of spaced side members, a pair of relatively rigid swing hangers, means pivotally mounting a swing hanger on each side member for transverse swinging movement relative thereto, and a load supporting member mounted directly on and extending between the swing hangers, the swing hangers, the load supporting member, the means mounting the swing hangers on the side members and the load supporting member on the swing hangers cooperating to resist substantial unsquaring of the side members and constituting the only means for this purpose, the mountings of the swing hangers on the side members and the plank on swing hangers cooperating with the plank and swing hangers to provide a degree of elasticity sufficient to permit limited unsquaring of the side members.

42. In a railway truck comprising a pair of spaced axles, wheels therefor, a pair of spaced side members mounted on said axles, a swing hanger pivotally mounted on each side member on pivot axes extending longitudinally of the side members and located at or below the level of support of the side members on the axles, and a load supporting member extending between the swing hangers and pivotally mounted thereon for movement relative thereto about axes extending longitudinally of the side members, the swing hangers, the load supporting member and the several pivotal mountings cooperating to resist substantial unsquaring of the side members and constituting the only means for this purpose, the mountings of the swing hangers on the side members and the plank on swing hangers cooperating with the plank and swing hangers to provide a degree of elasticity sufficient to permit limited unsquaring of the side members.

43. In a railway truck comprising a pair of spaced side members mounted on wheeled axles, a pair of swing hangers, one mounted on each side frame for transverse swinging movement relative thereto, each swing hanger being non-resilient in a vertical direction, and a load supporting plank member extending between and pivotally supported on the swing hangers, the swing hangers, the load supporting member, the swing hanger mountings and the mounting of the load supporting member on the swing hanger cooperating to resist substantial unsquaring of the side members and constituting the only means for this purpose, the mountings of the swing hangers on the side members and the plank on swing hangers cooperating with the plank and swing hangers to provide a degree of elasticity sufficiently to permit limited unsquaring of the side members.

ROBERT N. JANEWAY.

REFERENCES CITED

The following references are of record in the file of this patent:

UNITED STATES PATENTS

| Number | Name | Date |
|---|---|---|
| 40,957 | Smith | Dec. 15, 1863 |
| 485,652 | Pfingst | Nov. 8, 1892 |
| 655,738 | Robinson | Aug. 14, 1900 |
| 826,870 | Otis | July 24, 1906 |
| 849,193 | Bettendorf | Apr. 2, 1907 |
| 897,912 | Lowry | Sept. 8, 1908 |
| 1,151,858 | Brock | Aug. 31, 1915 |
| 1,916,146 | Hedgcock | June 27, 1933 |
| 2,052,639 | Martin | Sept. 1, 1936 |
| 2,128,505 | Sproul | Aug. 30, 1938 |
| 2,267,153 | Holland | Dec. 23, 1941 |
| 2,296,769 | Cox | Sept. 22, 1942 |
| 2,344,034 | Elsey | Mar. 14, 1944 |
| 2,373,508 | Snyder | Apr. 10, 1945 |
| 2,483,858 | Van Der Sluys | Oct. 4, 1949 |

FOREIGN PATENTS

| Number | Country | Date |
|---|---|---|
| 788,661 | France | July 29, 1935 |